United States Patent
Onda et al.

(10) Patent No.: US 8,626,842 B2
(45) Date of Patent: Jan. 7, 2014

(54) CONTENT TRANSACTION MANAGEMENT SERVER DEVICE, CONTENT-PROVIDING SERVER DEVICE, AND TERMINAL DEVICE AND CONTROL PROGRAM

(75) Inventors: Yasushi Onda, Tokyo (JP); Izua Kano, Tokyo (JP); Dai Kamiya, Tokyo (JP); Yusuke Kushida, Tokyo (JP); Keiichi Murakami, Tokyo (JP); Eiju Yamada, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 776 days.

(21) Appl. No.: 12/526,067

(22) PCT Filed: Feb. 7, 2008

(86) PCT No.: PCT/JP2008/052009
§ 371 (c)(1),
(2), (4) Date: Sep. 15, 2010

(87) PCT Pub. No.: WO2008/096808
PCT Pub. Date: Aug. 14, 2008

(65) Prior Publication Data
US 2011/0004555 A1    Jan. 6, 2011

(30) Foreign Application Priority Data
Feb. 8, 2007    (JP) .................................. 2007-029714

(51) Int. Cl.
*G06F 11/00*    (2006.01)
(52) U.S. Cl.
USPC ................................. 709/206; 714/2; 714/6.1
(58) Field of Classification Search
USPC ............................................. 709/216; 714/2
See application file for complete search history.

(56) References Cited

U.S. PATENT DOCUMENTS

| 8,028,322 B2 * | 9/2011 | Riedl et al. ..................... 725/134 |
| 2001/0016836 A1 * | 8/2001 | Boccon-Gibod et al. ........ 705/51 |

(Continued)

FOREIGN PATENT DOCUMENTS

| JP | 09114787 | 5/1997 |
| JP | 2001051960 | 2/2001 |

(Continued)

OTHER PUBLICATIONS

Office Action for Japanese Patent Application Serial No. 2007-029714 dated Feb. 14, 2012.

(Continued)

*Primary Examiner* — Evens J Augustin
(74) *Attorney, Agent, or Firm* — MKG, LLC

(57) ABSTRACT

A content transaction management server device includes: a memory storing decryption keys used in decryption of encrypted content data; a communication unit for information; a payment-request reception unit receiving, through the communication unit, a first storage address indicating a storage area where the decryption keys of encrypted content data in the memory are stored and user identifiers identifying users who are purchasers of the encrypted content data; a payment-procedure processing unit implementing payment-procedure processes related to purchase transactions of encrypted content data by a user identified by user identifiers in the payment request; and a decryption-key transmission unit that, after payment-procedure processing based on the payment-procedure processing unit is completed, reads out, from the memory, decryption keys stored in the storage area indicated by the first storage address included in the payment request and transmits, through the communication unit, the decryption keys to the transmission source of the payment request.

4 Claims, 8 Drawing Sheets

(56) References Cited

U.S. PATENT DOCUMENTS

| | | | |
|---|---|---|---|
| 2002/0183985 A1* | 12/2002 | Hori et al. | 703/1 |
| 2005/0177853 A1* | 8/2005 | Williams et al. | 725/81 |
| 2006/0218604 A1* | 9/2006 | Riedl et al. | 725/91 |
| 2007/0156594 A1* | 7/2007 | McGucken | 705/51 |
| 2008/0147821 A1* | 6/2008 | Dietrich et al. | 709/216 |

FOREIGN PATENT DOCUMENTS

| | | |
|---|---|---|
| JP | 2001103047 | 4/2001 |
| JP | 2001-331666 A | 11/2001 |
| JP | 2004013743 | 1/2004 |
| JP | 2004-54451 A | 2/2004 |
| JP | 2004048533 | 2/2004 |
| JP | 2006-163538 A | 6/2006 |

OTHER PUBLICATIONS

European Search Report for EP App. Serial No. 08710899.9-2221 dated Jan. 18, 2011.

Notice from the EPO dated Oct. 1, 2007 concerning business methods.

* cited by examiner

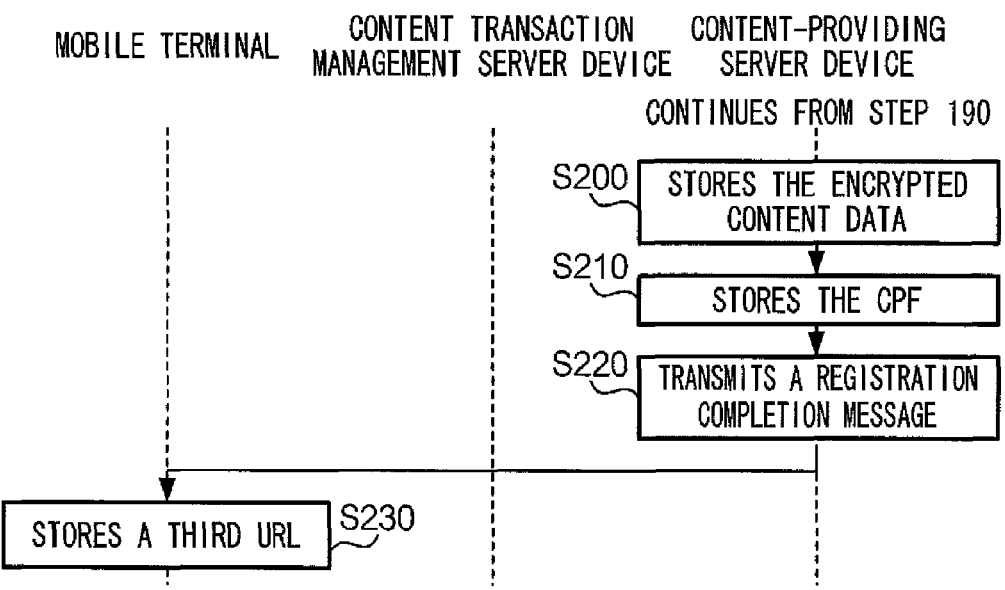
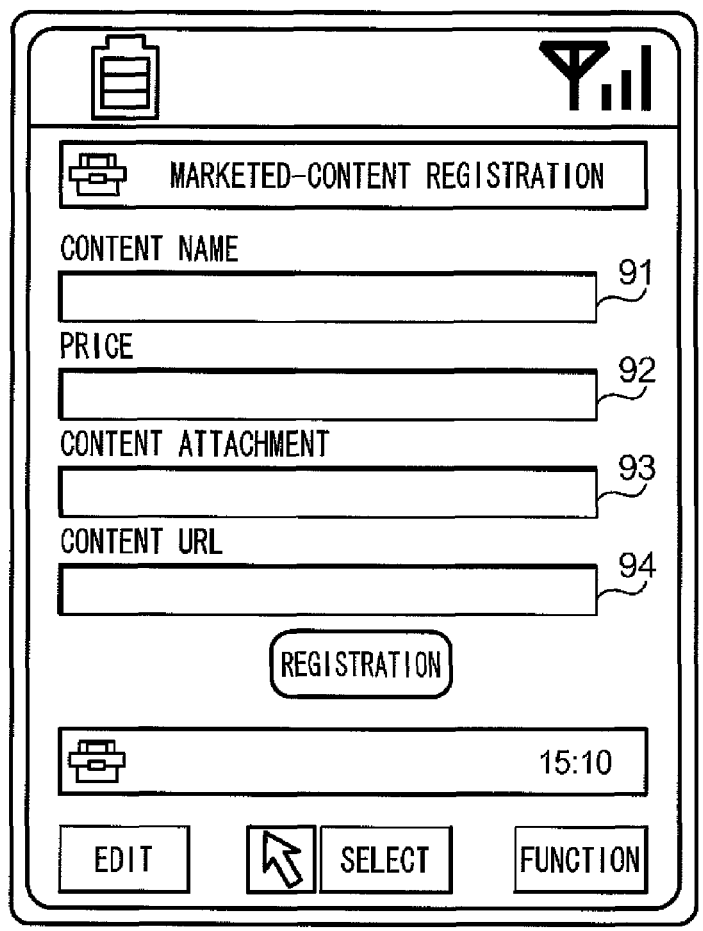

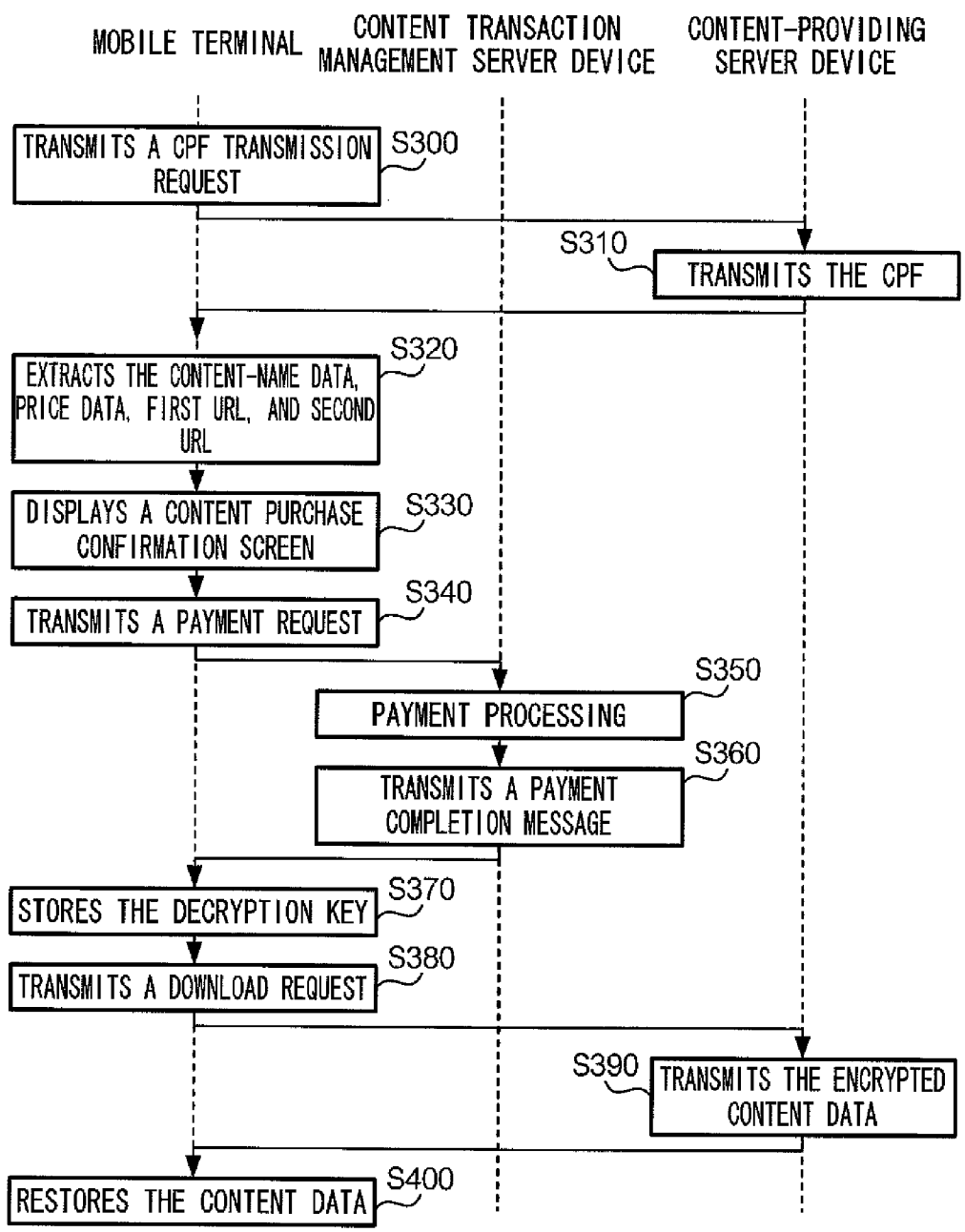

CONTENT TRANSACTION MANAGEMENT SERVER DEVICE, CONTENT-PROVIDING SERVER DEVICE, AND TERMINAL DEVICE AND CONTROL PROGRAM

TECHNICAL FIELD

The present invention relates to transaction of encrypted content over a network.

RELATED ART

Systems for delivering various content data to users of a network in exchange for payment of costs through predetermined payment processes are in widespread use. Various types of mechanisms for efficiently operating these types of systems have been proposed. For example, in the digital content transaction support system disclosed in JP-A-2004-13743, encrypted content data is stored on a server device and a decryption key for such content data is transmitted to the terminal of the purchaser after the completion of payment processes by the purchaser.

SUMMARY

It is noted here that in cases of individual entities selling original content data, it is not easy for such entities to efficiently collect payment for such data. Namely, it is often necessary for sales to be implemented through a procedure of encrypting the original content data and registering the same on a server device on a network, requesting a deposit of payment for content data by specifying a bank account to an applicant of the content data, and transmitting decryption keys to the applicant after completing confirmation of receipt of the payment.

However, in employing this mechanism the seller of the content data is required to perform cumbersome tasks such as a confirmation of a payment received, and a further problem exists in that it may not be possible to provide immediately to an applicant content data for which the applicant has applied.

The present invention has been proposed in view of the background outlined above and aims to provide a mechanism for efficiently performing content-data transactions without requiring cumbersome tasks to be carried out by the seller or purchaser.

According to an aspect of the present invention, there is provided a content transaction management server device including: storage means for storing a decryption key used for decryption of encrypted content data; communication means for communicating information; payment-request reception means for receiving a payment request through the communication means, the payment request including a first storage address and a user identifier, the first storage address indicating a storage area in the storage means in which the decryption key is stored, the user identifier identifying a user, who is a purchaser of the encrypted content data; payment-procedure processing means for performing payment-procedure processes related to a transaction for purchase of the encrypted content data by the user identified by the user identifier included in the payment request; and decryption-key transmission means for transmitting the decryption key through the communication means to a transmission source of the payment request, after the payment-procedure processing by the payment-procedure processing means is completed, the transmitted decryption key being read out from the storage area in the storage means, the storage area being indicated by the first storage address included in the payment request.

According to an aspect of this content transaction management server device, content-data transactions can be performed efficiently without requiring cumbersome tasks to be carried out by the seller or purchaser.

This exemplary embodiment of a content transaction management server device may further include: content-data reception means for receiving, through the communication means, content data as well as a second storage address indicating a storage area of an external device; encryption means for generating encrypted content data by applying a predetermined encryption key to the received content data; storage control means for controlling the storage means to store a decryption key that is a counterpart of the encryption key used in the encryption by the encryption means; and file transmission means for transmitting a definitions file and the encrypted content data, through the communication means to a transmission source of the content data and the second storage address, the definitions file including the first storage address indicating the storage area where the decryption keys are stored and the second storage address, the encrypted content data being generated by the encryption means.

According to an aspect of this content transaction management server device, the definitions file for acquisition procedures and encrypted content data are transmitted to the source of transmission of the content data and the second storage address.

Moreover, the above exemplary embodiment may further include: content-data reception means for receiving, through the communication means, content data including a plurality of data sets, a second storage address indicating a storage area of an external device, and a data-set identifier for identifying one of the data sets included in the content data; encryption means for generating encrypted content data including an encrypted data set and unencrypted content data, by applying a predetermined encryption key to a data set specified from among the received content data by the data-set identifier; storage control means for controlling the storage means to store a decryption key that is a counterpart of the encryption key used in the encryption by the encryption means; and file transmission means for transmitting a definitions file and the encrypted content data through the communication means to a transmission source of the content data and the data-set identifiers, the definitions file including the first storage address, the second storage address and the data-set identifier, the encrypted content data being generated by the encryption means.

According to an aspect of this content transaction management server device, the definitions file for data-set acquisition procedures and encrypted content data are transmitted to the transmission source of the content data and data-set identifiers.

In addition, the above exemplary embodiment may further include: content-data reception means for receiving, through the communication means, content data including a plurality of data sets as well as a data-set identifier for specifying a data set included in the content data; encryption means for generating encrypted content data including an encrypted data set and unencrypted content data, the encrypted data set being encrypted by applying a predetermined encryption key to a data set specified from among the received content data by the data-set identifier; storage control means for controlling the storage means to store a decryption key that is a counterpart of the encryption key used in the encryption by the encryption means; and file transmission means for transmitting, through the communication means to a transmission source of the content data and the data-set identifier, a definitions file for data-set acquisition procedures and encrypted content data, the definitions file including the first storage address and the data-set identifier, the encrypted content data being generated by the encryption means.

According to an aspect of this content transaction management server device, the definitions file for acquisition procedures and encrypted content data is transmitted to the transmission source of the content data and data-set identifiers.

According to another aspect of the invention, there is provided a content-providing server device including: storage means for storing information; communication means for communicating information; file reception means for receiving encrypted content data and a definitions file for acquisition procedures, the definitions file including a first storage address and a second storage address, the first storage address indicating a storage area in which a decryption key is stored, the decryption key being a counterpart of an encryption key used for generating the encrypted content data, the second address indicating a storage area in the storage means; storage control means for controlling the storage area to store the encrypted content data in the storage area indicated by the second storage address, and to store the definitions file in another storage area different from the storage area; file transmission means for transmitting the definitions file, the definitions file being read out from the storage means; request reception means for receiving, through the communication means, a download request including the second storage address from a transmission source of the definitions file; and encrypted-content-data transmission means for transmitting, through the communication means to a transmission source of the download request, the encrypted content data read out from the storage area in the storage means indicated by the second storage address included in the received download request.

According to an aspect of this content-providing server device, encrypted content data are transmitted to the transmission source of the download request.

According to yet another aspect of the invention, there is provided a terminal device including: storage means for storing a user identifier for identifying a user of the terminal device; communication means for communicating information; file reception means for receiving, through the communication means, a definitions file for download acquisition procedures including a first storage address and a second storage address, the first storage address indicating a storage area in a first external device in which a decryption key is stored, the decryption key being a counterpart of an encryption key used for encrypting content data, the second storage address indicating a storage area of a second external device in which the encrypted content data is stored, the encrypted content data being encrypted with the encryption key; payment-request transmission means for transmitting, through the communication means to the first external device, a payment request including the first storage address and a user identifier, is the first storage address being included in the definitions file, the user identifier being read out from the storage means; download-request transmission means for transmitting, through the communication means to the second external device, a download request including the second storage address, the second storage address being extracted from the definitions file and; content reception means for receiving, through the communication means, encrypted content data stored in a storage area of the second external device indicated by the second storage address; decryption-key reception means for receiving, through the communication means, the decryption key stored in the storage area of the first external device indicated by the first storage address; and decryption means for decrypting content data by applying the received decryption key to the received encrypted content data.

According to an aspect of this terminal device, content data is decrypted by applying received decryption keys to encrypted content data.

According to yet another aspect of the invention, there is provided A program causing a computer device to execute a process, the computer device including storage means for storing a user identifier for identifying a user of a terminal device and communication means for communicating information, the process including: receiving, through the communication means, a definitions file for download acquisition procedures including a first storage address and a second storage address, the first storage address indicating a storage area in a first external device in which a decryption key is stored, the decryption key being a counterpart of an encryption key used for encrypting content data, the second storage address indicating a storage area of a second external device in which the encrypted content data is stored, the encrypted content data being encrypted with the encryption key; transmitting, through the communication means to the first external device, a payment request including the first storage address and a user identifier, is the first storage address being included in the definitions file, the user identifier being read out from the storage means; transmitting, through the communication means to the second external device, a download request including the second storage address, the second storage address being extracted from the definitions file and; receiving, through the communication means, encrypted content data stored in a storage area of the second external device indicated by the second storage address; receiving, through the communication means, the decryption key stored in the storage area of the first external device indicated by the first storage address; and decrypting content data by applying the received decryption key to the received encrypted content data.

According to an aspect of this program, content-data transactions can be performed efficiently without requiring cumbersome tasks to be carried out by the seller or purchaser.

BRIEF DESCRIPTION OF THE DRAWINGS

Exemplary embodiments of the present invention are described in detail based on the following figures, wherein:

FIG. 7 shows a flowchart showing a process for a content registration service;

FIG. 8 shows a marketed-content registration screen;

FIG. 10 shows a flowchart showing a process for a content purchasing service;

DESCRIPTION OF REFERENCE SYMBOLS

11: Controller. 12: Transmission and reception part. 13: Instruction input part. 14: Liquid crystal display. 15: CPU. 16: RAM. 17: ROM. 18: EEPROM. 20: Mobile packet communication network. 30: Content-providing server device. 30: Same server device. 31: Controller. 32: Communication interface. 33: Hard disk. 34: CPU. 35: RAM. 36: ROM. 40: Internet communication network. 50: Gateway server device. 60: Content transaction management server device. 60: Content transaction server device. 61: Controller. 62: Communication interface. 63: Hard disk. 64: CPU. 65: RAM. 66: ROM. 70: Payment system. 71: Browser. 72: Mailer. 73: OS. 74: Java execution environment. 77: Class library. 78: JVM. 79: JAM.

DETAILED DESCRIPTION

An exemplary embodiment of the present invention will now be described.

First, terms used in the present exemplary embodiment will be defined. "Carrier" refers to a party that administers a mobile packet communication network. "User" refers to a party that enters into a user agreement for a mobile packet communication network with a carrier. "Content provider" refers to a party that provides services for registering content data uploaded by the user on a server device connected to the Internet and for downloading such content data in response to a purchase request from a user. "Content data" includes information expressed using at least one of text, music, and/or images, such as, for example, electronic books, music, movies, video clips, Web pages, and the like. Moreover, the concept of "content data" may also include various computer programs, such as game software, Java (registered trademark) applets, and the like, as well as function groups known as API (Application Program Interface). Furthermore, "content data" may also be various items used by a player in a role-playing game, for example. In essence, in the present exemplary embodiment, "content data" refers to electronic information provided to a user after payment procedures are completed.

The content transaction system related to the present exemplary embodiment is characterized as first transmitting a unique file known as a CPF (contents payment file) to a user applying to purchase content data registered on a server device of a content provider and, by having subsequent processes executed in accordance with descriptions in the CPF, facilitating procedures from payment to the acquisition of content data. The CPF functions as a file that defines procedures for acquiring content data, or, in other words, as a definitions file for acquisition procedures.

Figure 1:
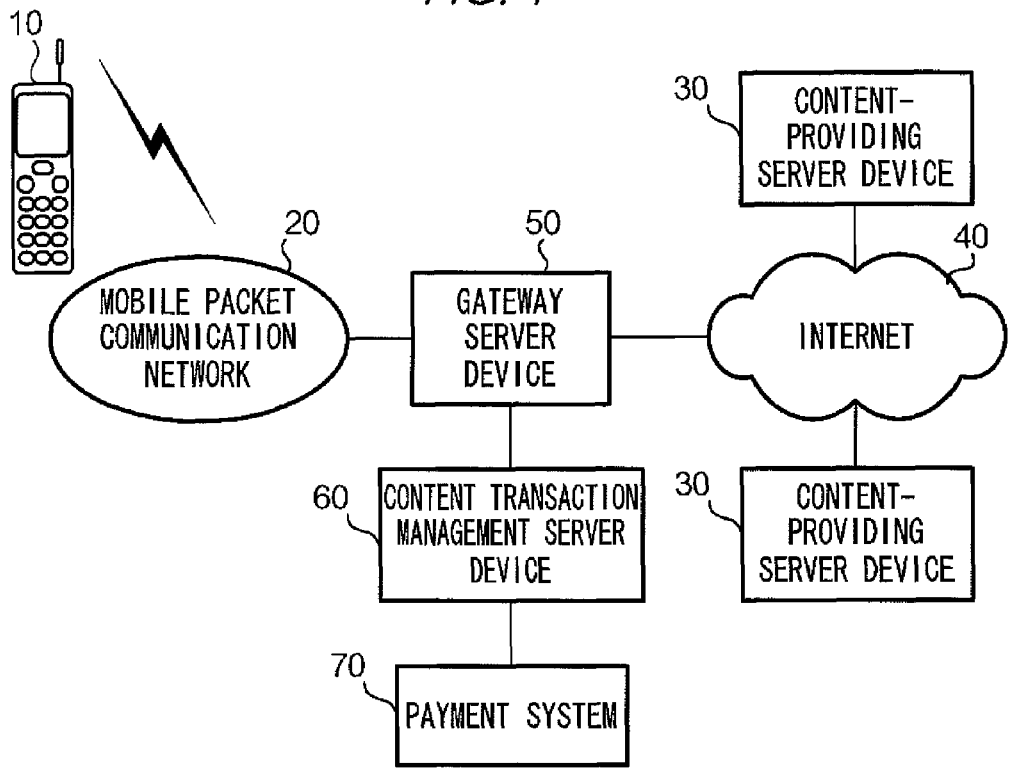
FIG. 1 shows an overall configuration of a content transaction system.

FIG. 1 shows an overall configuration of a content transaction system related to the present exemplary embodiment. As shown in the figure, this system includes a mobile packet communication network 20 to which a mobile terminal 10 is connected, the Internet 40 to which a content-providing server device 30 is connected, a gateway server device 50 that intervenes between the two communication networks, a content transaction management server device 60 that functions as a proxy of the gateway server device 50, and a payment system 70. In addition, as shown in the figure, multiple content-providing server devices 30 are connected to the Internet 40. The payment system 70 is a system including various financial networks, for example, a JBA (Japanese Bankers Association) network or CAFIS (Credit and Finance Information System) network (not shown). The content transaction management server device 60 performs payment-procedure processing related to transactions of content data and requests payment processing by the payment system 70, and payment processing by the payment system 70 is thereby executed.

The mobile packet communication network 20 is an aggregation of nodes that transfer data through procedures compliant with a protocol, for example, a simplified protocol of TCP (transmission control protocol)/IP (Internet protocol) or a protocol corresponding to HTTP (hyper text transfer protocol) implemented via TCP/IP, and the like. The mobile packet communication network 20 includes a base station and a packet-subscriber processing device. The Internet 40 is an aggregation of nodes that transfer data through procedures compliant with TCP/IP or HTTP, SMTP (simple mail transfer protocol), and the like that are implemented via TCP/IP, and it includes a server device and a router.

The gateway server device 50 is a computer operating in a mobile packet gateway switching center that interconnects the mobile packet communication network 20 and the Internet 40 under the management of the carrier. Data delivered from a node of one communication network to a node of another communication network is transferred to the node of the other communication network upon having a protocol converted at the gateway server device 50.

Figure 2:
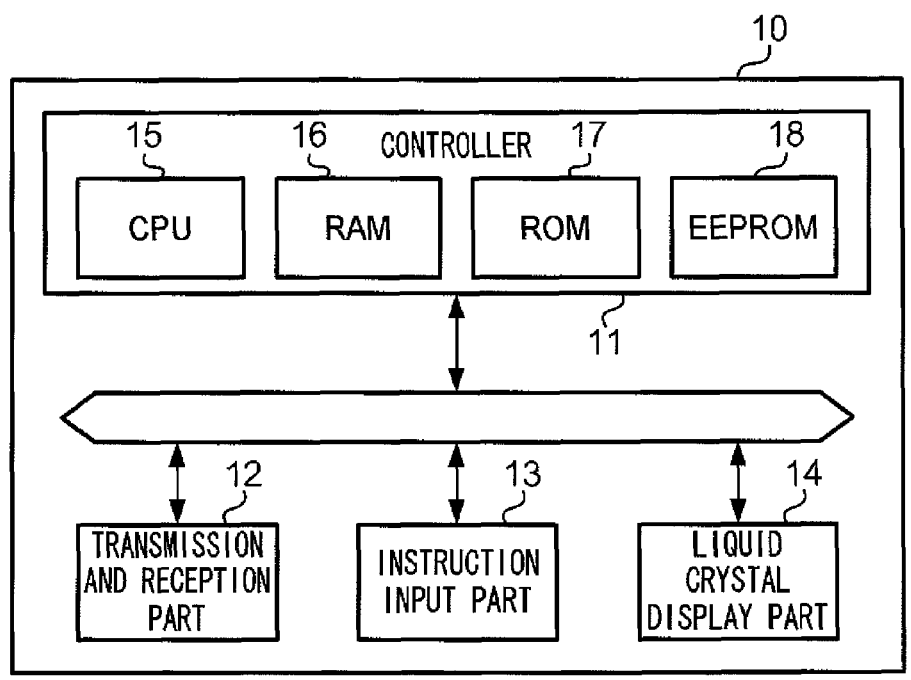
FIG. 2 shows a physical configuration of a mobile terminal.

FIG. 2 shows a physical configuration of a mobile terminal 10. The mobile terminal 10 includes a controller 11 (an example of file reception means, payment-request transmission means, download-request transmission means, content reception means, decryption-key reception means, and decryption means), a transmission and reception part 12 (an example of communication means), an instruction input part 13, and a liquid crystal display 14.

The transmission and reception part 12 performs wireless communication with a base station of the mobile packet communication network 20 under the control of the controller 11. The instruction input part 13 includes various buttons, such as PB (push buttons) and the like, and cursor keys. When an input operation is performed by a user, the instruction input part 13 supplies to the controller 11 a signal corresponding to the input operation. The liquid crystal display 14 includes a display device such as a liquid crystal panel or the like. The liquid crystal display 14 displays a variety of information under the control of the controller 11.

The controller 11 includes a CPU 15, RAM 16, ROM 17 and EEPROM 18 (an example of memory).

The CPU 15 executes various programs stored in the ROM 17 and EEPROM 18 with using the RAM 16 as a work area.

The ROM 17 stores preinstalled programs. The preinstalled programs are programs that are stored in the ROM 17 during the process of manufacturing the mobile terminal 10. For example, the preinstalled programs can include a multitask operating system (hereinafter referred to as "multitask OS"), Java(R) platform programs, and native application programs. The multitask operating system is an operating system that supports various functions, such as allocation of virtual memory space, that is necessary for implementing virtual parallel executions of multiple tasks based on a TSS (Time-Sharing System). The Java platform programs are a program group prepared in accordance with a CDC (Connected Device Configuration) in order to implement the Java execution environment described below. The native applications are programs that implement services of the mobile terminal 10, such as telephone calls, browsing, transmission and reception of a mail, and the like. The native applications include, for example, a mailer application for receiving provided mail-transmission and -reception services and a browser application for receiving provided browsing services.

The EEPROM 18 includes a Java application storage area. Java applications are stored in this storage area. A Java application includes a Jar (Java Archive) file and an ADF (Application Descriptor File). The Jar file includes a program body, image files and sound clips used during the execution of the actual programs. The program body describes procedures of processes under Java execution environment, The ADF describes information used in the installation or startup of the program, and various attributes of the Jar file. The Java application is prepared by, for example, the carrier, and stored in, for example, the content transaction management server device 60 or a server device in the Internet 40. The Java application is downloaded from the server device in response to a request from the mobile terminal 10.

Moreover, the EEPROM 18 stores a PIN (Personal Identity Number) issued by the carrier in order to uniquely identify a user.

Figure 3:
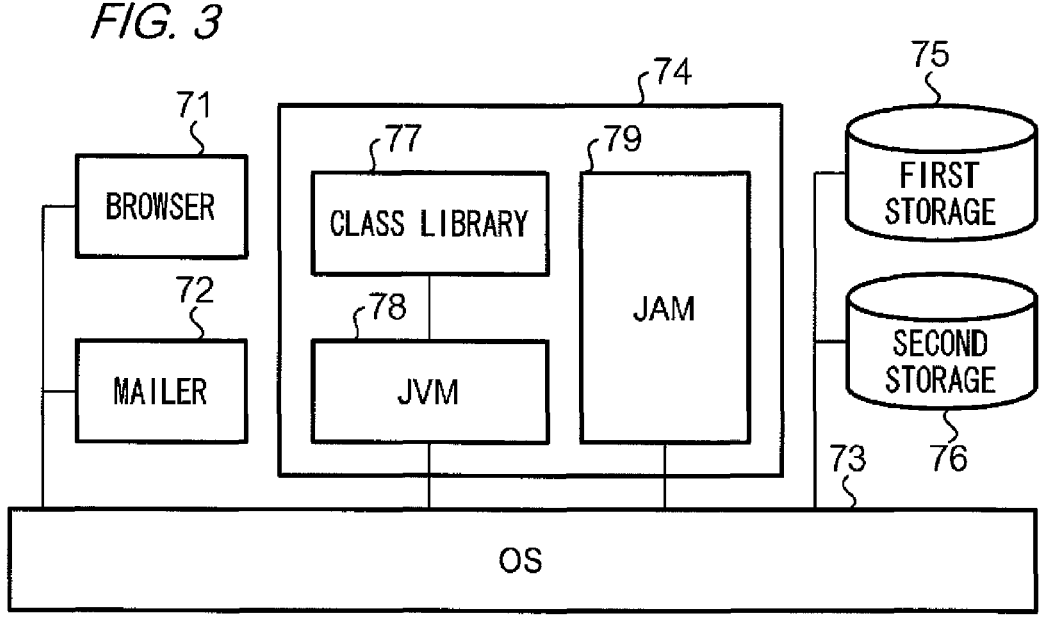
FIG. 3 shows a logical configuration of a mobile terminal.

FIG. 3 shows a logical configuration of the mobile terminal 10, implemented by the controller 11 executing various programs stored in the ROM 16 and EEPROM 18. As shown in the figure, a browser 71, a mailer 72, and a Java execution environment 74 are implemented on an OS 73 in the mobile terminal 10 executing various programs. In the EEPROM 18, a first storage 75 and second storage 76 are reserved. The browser 71 and mailer 72 are implemented by native applications stored in the ROM 16. The browser 71 and mailer 72 provides functions of receiving and interpreting of data described in HTML (Hyper Text Markup Language) format, and transmitting and receiving an electronic mail, and the like.

The Java execution environment 74 is implemented by the Java platform programs stored in the ROM 16. The Java execution environment 74 includes a class library 77, a JVM (Java Virtual Machine) 78, and a JAM (Java Application Manager) 79. The class library 77 includes program module groups, which are each known as a "class" and have highly versatile and specific functions, in a single file. The JVM 78 is a JVM that is optimized for the CDC, which is a configuration for a portable device loaded with a multitask OS. The JVM 78 provides functions of interpreting and executing byte codes included in a Java application. The JAM 79 provides functions of controlling downloads and installations of the Java applications.

The first storage 75 includes an storage area in which the Java applications (Jar files and ADF) downloaded under the control of the JAM 79 are stored. The second storage 76 includes a storage area for storing data generated during the execution of a Java application after the Java application is terminated. In the second storage 76, an individual storage area is allocated for an installed Java application. Data stored in a certain storage area allocated to a certain Java application is rewritable only by the Java application, and other Java applications cannot rewrite data stored in that storage area.

Figure 4:
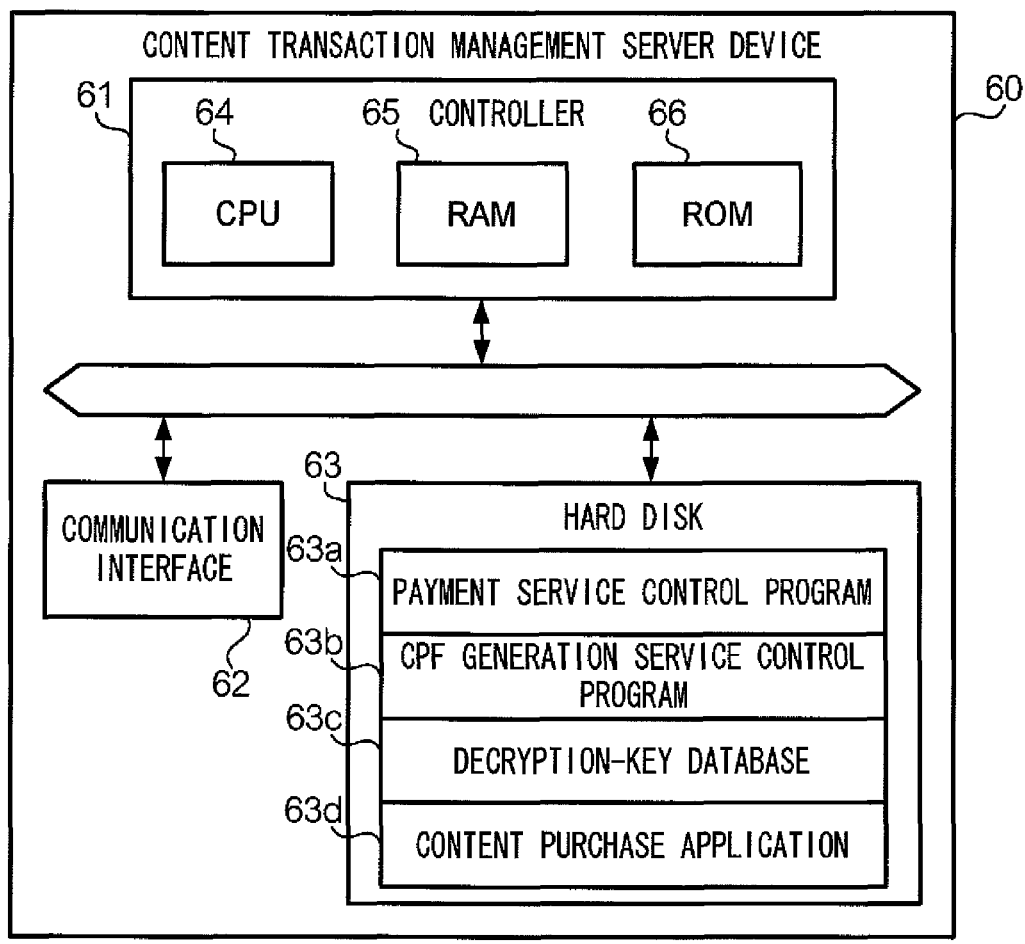
FIG. 4 shows a schematic diagram of a hardware configuration of a content transaction management server device.

FIG. 4 shows a hardware configuration of the content transaction management server device 60. The server device operates under the management of a carrier. As shown in the figure, the content transaction management server device 60 includes a controller 61 (an example of payment-request reception unit, payment-procedure processing unit, decryption-key transmission unit, content-data reception unit, an encryption unit, content control unit, and file transmission unit), a communication interface 62 (an example of communication unit), and a hard disk 63 (an example of memory).

The controller 61 includes a CPU 64, a RAM 65, and a ROM 66.

The communication interface 62 controls transmission and reception of data in accordance with a protocol such as TCP/IP, HTTP, and the like.

The hard disk 63 stores a payment service control program 63a, a CPF generation service control program 63b, a decryption-key database 63c, and a content purchase application 63d.

The payment service control program 63a is a program for paying purchase costs in response to a request from the mobile terminal 10 of a user purchasing content data.

The CPF generation service control program 63b is a program for encrypting the content data and generating CPF in response to a request from the mobile terminal 10 of a user selling content data. The details of the CPF are described in the paragraph on the operational description below.

The decryption-key database 63c stores decryption keys, each of which is a counterpart of an encryption key used in the encryption of content data.

The content purchase application 63d is a unique Java application (Jar files and ADF) prepared by a carrier in order to be downloaded by the mobile terminal 10. The content purchase application 63d provides to the JVM functions such as payment of purchase cost in accordance with a CPF or decryption of content data using decryption keys.

Figure 5:
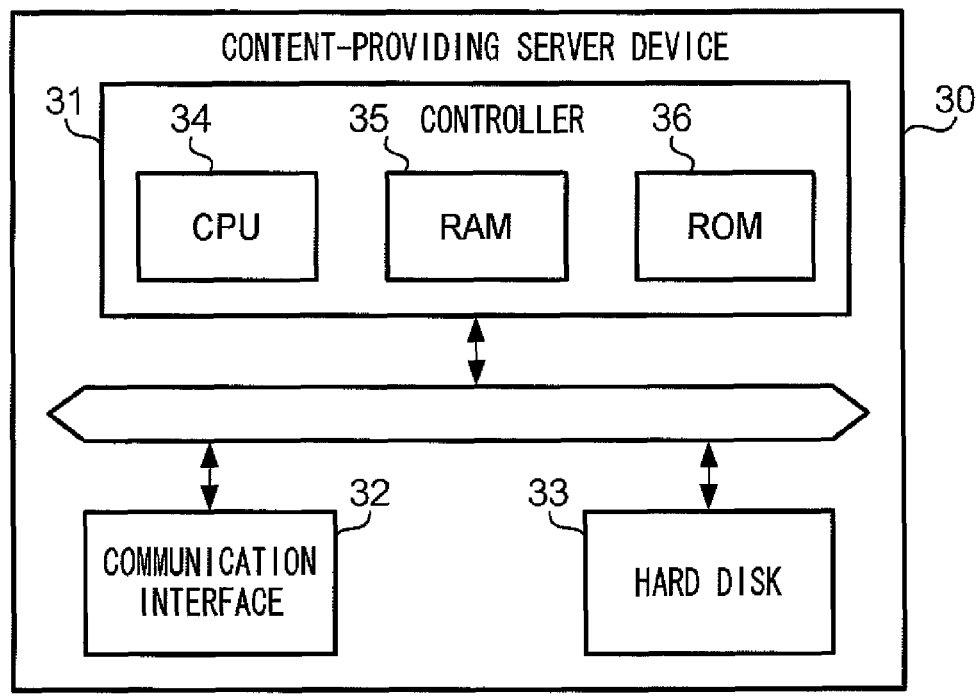
FIG. 5 shows a schematic diagram of a hardware configuration of a content-providing server device.

FIG. 5 shows a hardware configuration of the content-providing server device 30. The content-providing server device 30 operates under the management of a content provider. As shown in the figure, the content-providing server device 30 includes a controller 31 (an example of file reception unit, storage control unit, request reception unit and content transmission unit), a communication interface 32 (an example of communication unit), and a hard disk 33 (an example of memory).

As in the content transaction management server device 60, the controller 31 includes a CPU 34, RAM 35, and ROM 36, and moreover, the configuration of the communication interface 32 is also identical to that of the above server device 60.

In the hard disk 33, there is reserved a storage area for storing encrypted content data, for which encryption is implemented, through the content transaction management server device 60, as well as CPF generated by the above server device 60 during the encryption.

Next, the operations of the present exemplary embodiment will be described.

The operations of the present exemplary embodiment can be classified broadly between content-registration-service processing and content-purchasing-service processing. These two processes are started by a mobile terminal 10 in which a content purchase application 63d, which is stored on the content transaction management server device 60, is downloaded. Once there is an instruction from the instruction input part 13 of the mobile terminal 10 to open the content purchase application 63d, first, a service selection screen prompting the selection of either a content registration service or a content purchasing service is displayed on a liquid crystal display 14. The content-registration-service processing or the content-purchasing-service processing is started after the respective content registration service or content purchasing service is selected through further operation of the instruction input part 13.

Figure 6:
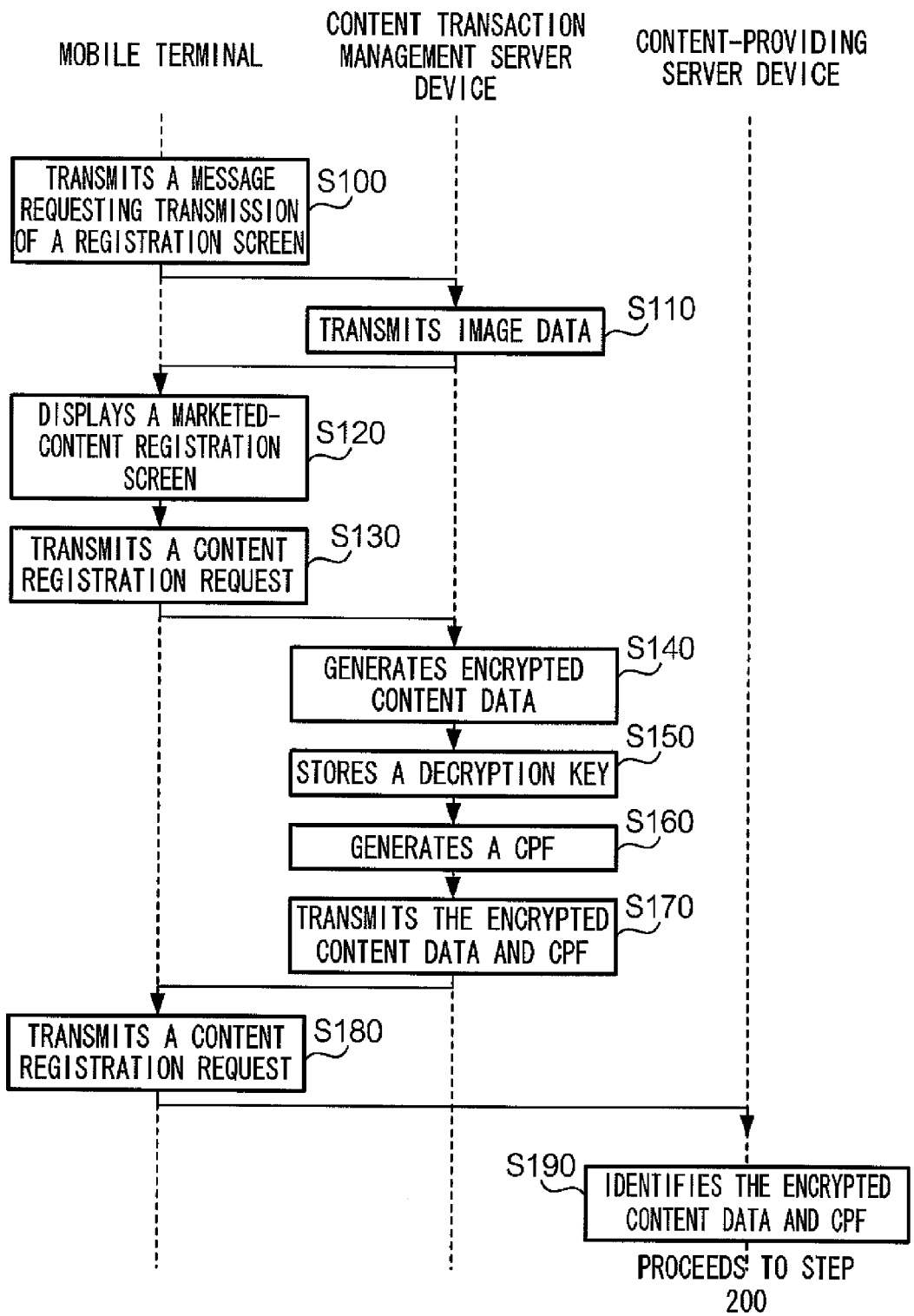
FIG. 6 shows a flowchart showing a process for a content registration service.

FIG. 6 and FIG. 7 are flowcharts showing processes for a content registration service.

A user using the content registration service operates his/her mobile terminal 10 to store in the EEPROM 18, content data created using, for example, a drawing application, composing application, or the like. The user selects the content registration service from the service selection screen upon receiving, from the content provider, an allocated URL (Uniform Resource Locator) of a storage area of the content-providing server device 30, which is reserved for the storage of the content data.

When the content registration service is selected, the controller 11 of the mobile terminal 10 transmits, to the content transaction management server device 60, a request for transmitting a marketed-content registration screen (S100). The request is transmitted through a mobile packet communication network 20 and a gateway server device to the content transaction management server device 60.

When the controller 61 of the content transaction management server device 60 receives the request, the controller 61 transmits, to the mobile terminal 10, display data of the marketed-content registration screen (S110). The display data is data describing the layout of the marketed-content registration screen using HTML (Hyper Text Markup Language).

When the controller 11 of the mobile terminal 10 receives the display data, the controller 11 controls the liquid crystal display 14 to display the marketed-content registration screen (S120).

FIG. 8 shows an example of a marketed-content registration screen. Under the character string reading "Marketed-content registration" the screen includes a first input column 91 for inputting the content name, a second input column 92 for inputting the content price, a third input column 93 for inputting attached content, and a fourth input column 94 for inputting the URL of the content, and under these, a button reading "Register" is displayed.

The user, referring to the marketed-content registration screen, inputs, into the first input column 91 and the second input column 92, respectively, the name and price of the content that the user wishes to register by operating the instruction input part 13. After that, the user operates the instruction input part 13 so as to initiate operations for attaching content data stored in the EEPROM 18. Thereby, the file name of the content data being attached is input into the third input column 93. In addition, after inputting, into the fourth input column 94, the URL of the storage area of the content-providing server device 30 in which the content data is secured for storage, the user selects the "Register" button.

When the "Register" button is selected, the controller 11 of the mobile terminal 10 transmits, to the content transaction management server device 60, a content registration request including: data indicating the content name input in the first input column 91, the price input into the second input column 92 and the URL input into the fourth input column 94; and the attached content data (S130).

When the controller 61 of the content transaction management server device 60 receives the content registration request, the controller 61 generates encrypted content data by applying a unique encryption key to the content data included in the request (S140).

Subsequently, the controller 61 controls the decryption-key database 63c to store a decryption key that is a counterpart of the encryption key used in the encryption of Step 140 (S150).

In addition, the controller 61 generates a CPF (S160).

Figure 9:
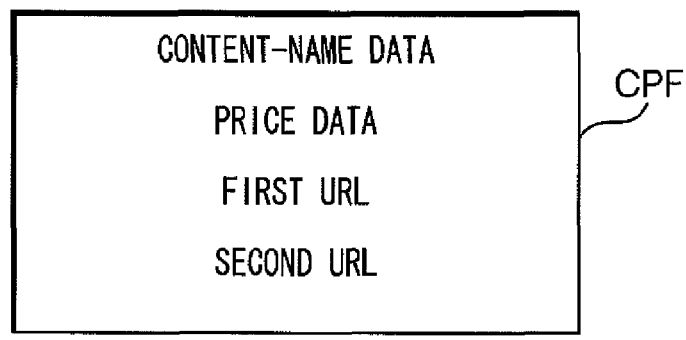
FIG. 9 shows a diagram showing a CPF.
Figure 12:
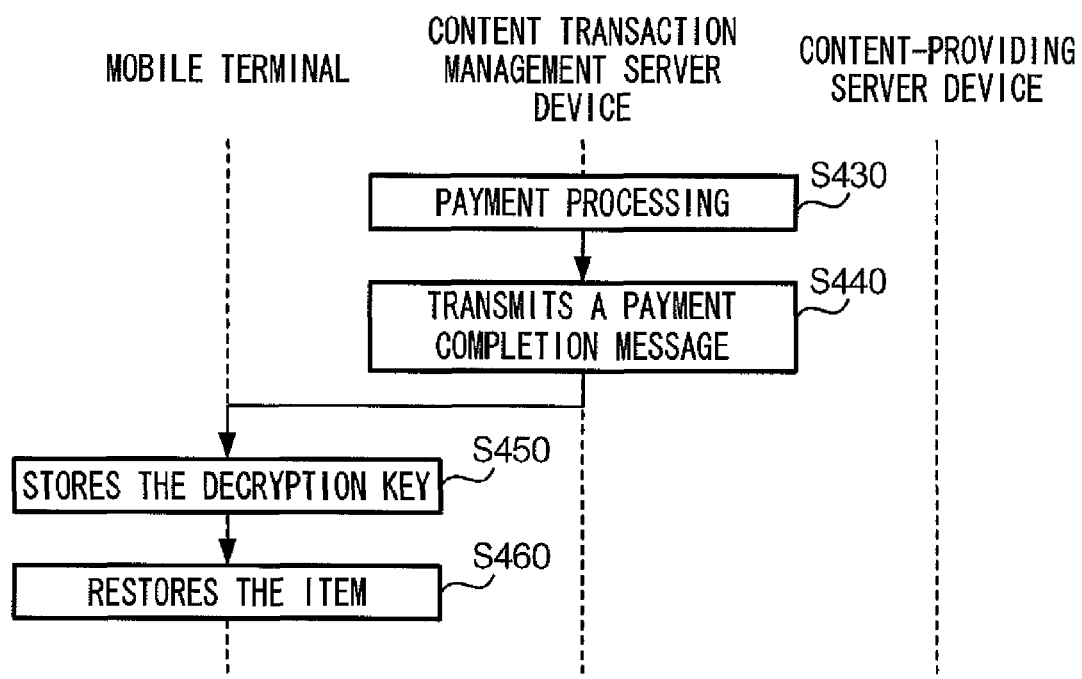
FIG. 12 shows a flowchart showing a separate example of a process for a content purchasing service.

FIG. 9 shows an example of a CPF generated in the Step 150. As shown in the figure, the CPF includes: content-name data indicating the content name; price data indicating the price; a URL (this URL hereinafter is referred to as "first URL" and is an example of the first storage address) indicating the storage area of the decryption-key database 63c in which the decryption key of Step 150 is stored; and the URL (this URL hereinafter is referred to as "second URL" and is an example of the second storage address) input into the fourth input column 94 of the marketed-content registration screen.

The controller 61 transmits, to the mobile terminal 10, the encrypted content data generated in Step 140 and the CPF generated in Step 160 (S170).

When the controller 11 of the mobile terminal 10 receives the encrypted content data and the CPF, the controller 11 transmits, to a content-providing server device 30, a content registration request including the encrypted content data and the CPF (S180). Here, as shown in FIG. 1, multiple content-providing server devices 30 are connected to the Internet communication network, but of these, the content registration request is transmitted with its destination being the content-providing server device 30 that has received an allocated URL (Uniform Resource Locator).

When the controller 31 of the content-providing server device 30 receives the content registration request, the controller identifies the encrypted content data and CPF from the request (S190).

The controller 31 controls the hard disk 33 to store in the storage area indicated by the second URL included in the CPF identified in Step 190 (i.e., the storage area indicated by the URL allocated in advance for storage of the content data), the encrypted content data identified in Step 190 (S200).

Subsequently, the controller 31 controls the hard disk 33 to store in an unused storage area the CPF identified in Step 190 (S210).

The controller 31 transmits, to the mobile terminal 10, a registration completion message including a URL (this URL hereinafter is referred to as "third URL") of the storage area of the hard disk 33 in which the CPF is stored in Step 210 (S220).

When the controller 11 of the mobile terminal 10 receives the registration completion message, the controller 11 controls the EEPROM 18 to store the third URL included in the message (S230).

With the above, the content-registration-service process is completed.

FIG. 10 is a flowchart showing a process for a content purchasing service.

A user using the content-purchasing-service process selects the content purchasing service from the service selection screen upon acquiring, from a separate user who has registered encrypted content data on a content-providing server device 30 using the content registration service, the third URL indicating the storage area of a CPF of content data and storing it on the EEPROM 18 of their mobile terminal 10.

When the content purchasing service is selected, the controller 11 of the mobile terminal 10 reads out the third URL stored in the EEPROM 18 and transmits, to the content-providing server device 30, a CPF transmission request including the third URL (S300).

When the controller 31 of the content-providing server device 30 receives the CPF transmission request, the controller 31 transmits, to the mobile terminal 10, the CPF stored in the hard disk 33 indicated by the third URL included in the request (S310).

When the controller 11 of the mobile terminal 10 receives the CPF, the controller 11 extracts, from the CPF, the content-name data, price data, first URL, and second URL (S320).

The controller 11 controls the liquid crystal display 14 to display a content purchase confirmation screen obtained by embedding, in a predetermined form, the content-name data and price data extracted in Step 320 (S330).

Displayed on the content purchase confirmation screen are the content name, which is indicated by the content name data, and the price, which is indicated by the price data, and under these are displayed a character string reading "Would you like to purchase this content?" and a button reading "Purchase."

The user referring to the content purchase confirmation screen selects the "Purchase" button through operations of the instruction input part 13.

If the "Purchase" button is selected, the controller 11 of the mobile terminal 10 transmits, to the content transaction management server device 60, a payment request including the content-name data, price data, and first URL extracted in Step 320 and the PIN code read out from the EEPROM 18 (S340).

If the content transaction management server device 60 receives the payment request, the controller 61 performs payment processing of the cost of the content data (S350). Specifically, the controller identifies, from a packet-communication-charge management database in a mobile packet gateway switching center, a call charge record of a user corresponding to the PIN code included in the payment request and adds the price data included in the payment request to the sum total of the call charge stored in the identified record. Thereby, the purchase amount of the content data is recorded in the calling rate claimed by the carrier from the user who is the purchaser. In this way, the process for determining the money amount claimed by a user is a payment-procedure process using the content transaction management server device 60.

Moreover, if the money amount determined through this type of payment-procedure process is reported to a payment system 70 and payment processing is requested, the payment system 70 withdraws the money amount from the bank account of the user who is the purchaser. At this time, the bank account used is a bank account that is pre-registered when the user enters into the user agreement with the carrier.

At the same time, regarding the user who is the seller, the controller 61 performs processing to provide the money amount equivalent to the price data included in the payment request. Specifically, the controller 61 identifies, from the packet-communication-charge management database, a call charge record of the user who is the seller and subtracts the price data included in the payment request from the sum total of the call charge stored in the identified record. Thereby, the calling rate claimed by the user who is the seller enters a state in which the sales total of the content data is deducted. Moreover, the calling rate from which the sales total is deducted is paid by the above payment system. In addition, if the sum total of the call charge becomes negative upon subtracting the price data, the negative amount is registered in the packet-communication-charge management database. In this case, the payment system 70 may perform processing to deposit the negative money amount into the bank account of the user who is the seller by using the money amount collected from the purchaser as funds.

If the controller 61 completes the payment processing, the controller 61 reads out the decryption key stored in the storage area of the decryption-key database 63c indicated by the first URL included in the payment request and transmits, to the mobile terminal 10, a payment completion message including the decryption key (S360).

If the mobile terminal 10 receives the payment completion message, the controller 11 controls the EEPROM 18 to store the decryption key included in the message (S370).

Subsequently, the controller 11 transmits, to the content-providing server device 30, a download request including the second URL extracted in Step 320 (S380).

If the content-providing server device 30 receives the download request, the controller 31 transmits, to the mobile terminal 10, the encrypted content data stored in the storage area of the hard disk 33 indicated by the second URL included in the request (S390).

If the mobile terminal 10 receives the encrypted content data, the controller 11 restores the content data by applying the decryption key to the encrypted content data (S400), the decryption key being stored in the EEPROM 18 in Step 370 and being read out from the EEPROM 18. The restored content data is played in response to, as a trigger, a predetermined operation through the instruction input part 13.

With the above, the content-purchasing-service process is completed.

In the present exemplary embodiment described above, when a user transmits original content data from the mobile terminal 10 to the content transaction management server device 60, the content transaction management server device 60 encrypts the content data. The content transaction management server device 60 returns the encrypted content data and CPF obtained through encryption to the mobile terminal 10. The content data and CPF are registered on the content-providing server device 30. The CPF includes a first URL, which is a URL of a storage area of the content transaction server device 60 in which a decryption key that is a counterpart of the encryption key used in the encryption is stored, and a second URL, which is a URL of a storage area of the content-providing server device 30 in which the encrypted content data is stored. When the mobile terminal 10 of the user purchasing the content sequentially transmits requests for the first URL and second URL included in the CPF, processes from the payment of compensation for the content to acquisition of the content are performed automatically.

In this way, by variously coordinating the mobile terminal 10, the content transaction management server device 60, and the content-providing server device 30 and executing a sequence of operations related to content-data transactions, it is possible to efficiently perform content-data transactions without requiring the conventional cumbersome tasks by either the seller or purchaser.

Moreover, the following is a further detailed description of the respective merits for the seller and the purchaser.

First, the seller can easily obtain a CPF and encrypted content data by registering content data on the content transaction management server device 60. Furthermore, the seller may sell content simply through operations of coordinating the obtained CPF and encrypted content data and storing the CPF and encrypted content in a downloadable state on the content-providing server device 30. Consequently, the merits for the seller are that there is no need to prepare encryption software and no need to establish a payment system.

The purchaser may obtain the CPF by accessing the content-providing server device 30 and specifying the desired content data, and may purchase the content data simply through relatively simple operations using the CPF.

First, when the purchaser refers to the CPF obtained using their personal mobile terminal 10 and performs operations for purchasing the content data, the mobile terminal 10 transmits, to the content transaction management server device 60, a payment request including the first URL, which refers to the storage area of the decryption key, the PIN code, and the like. In response to this request, the content transaction management server device 60 performs payment procedures for the user corresponding to the PIN code and also reads out the decryption key from the storage area indicated by the first URL and transmits the decryption key to the mobile terminal 10. At this stage, the purchaser may complete the payment procedure, which is absolutely imperative for the content-data transaction, and may also obtain the decryption key necessary for the decryption of the encrypted content data. If the decryption key may be obtained at approximately the same time that the payment procedure is completed as described above, all that subsequently remains is a simple operation for obtaining the encrypted content data.

Subsequently, the purchaser performs operations for requesting encrypted content data using the mobile terminal 10. In response to the operations, the mobile terminal 10 transmits, to the content-providing server device 30, a download request including the second URL. In response to this request, the content-providing server device 30 reads out the encrypted content data from the storage area indicated by the second URL and transmits it to the mobile terminal 10. The mobile terminal 10 decrypts the encrypted content data using the previously obtained decryption key and obtains the content data. In this way, the operations for acquiring the content data are not very different from standard procedures for downloading content data on the Web, for example, and the operational burden imposed on the purchaser is very low.

Further Embodiments

Various modified exemplary embodiments are possible for the present invention. The modified examples described below may also be used in combinations of two or more.

A configuration in which the content purchase application, instead of being a Java application operating in a Java execution environment, is preliminarily stored in the ROM 16 of a mobile terminal 10 as a native application may also be used.

In the above exemplary embodiment, the content purchase application is implemented in the mobile terminal 10 (i.e., a cellular phone handset that may access an Internet 40 intermediated by a mobile packet communication network 20), but similar functions may be obtained even if an application of the same type were implemented on a personal computer that may directly access the Internet 40.

Moreover, in the above exemplary embodiment, it is presumed that the person (the seller) registering the content data subject to sales on the content-providing server device 30 is a party who has entered into a user agreement for a mobile packet communication network with the carrier (i.e., a user). However, the seller is not limited to a party who has entered into a user agreement for a mobile packet communication network with the carrier, and may simply be a party having a communication terminal that may establish a communication connection with the content transaction management server device 60 and/or content-providing server device 30.

Regarding the method for determining the price of the content, a wide range of variations may be conceived. In the exemplary embodiment, the price is determined on the basis of each individual content, but the price may also be determined on the basis of the period of use of the content data. Specifically, the user who is the seller, when registering the content price on the marketed-content registration screen, registers a period and a compensation (price) for the act of using the content within that period and submits these to the purchaser. For example, if the seller wishes to provide, to the purchaser, a certain content for 100 yen per month, they register "1 month" as the "period" and "100 yen" as the "price," and this information is described in the CPF. In this case, the controller 11 of the mobile terminal 10 of the purchaser limits the period of use of the content in accordance with the details described in the CPF. That is, the controller 11 permits use of the content (e.g., start-up, execution, playing, transfer, and the like of the content data) during the period described in the CPF, but once the period described in the CPF has elapsed, the controller 11 does not permit use of the content.

Moreover, there is also a wide range of variations for the payment procedure.

In the exemplary embodiment, the bank account used for payment is a bank account that is registered in advance when the user enters into the user agreement with the carrier. However, as alternatives, for example, a bank account used for payments for a credit card owned by the user may be used, or a bank account used through a credit function implemented on the mobile terminal 10 may be used.

Furthermore, payments may be made using an electronic value implemented on the mobile terminal 10. In this case, the payment-procedure process of the content transaction management server device 60 is as follows.

If the content transaction management server device 60 receives the payment request, the controller 61 requests, from the mobile terminal 10 corresponding to the PIN code included in the payment request, the electronic value equivalent to the price data included in the payment request. In response to this request, the mobile terminal 10 subtracts, from the electronic value stored therein, the requested electronic value. If the mobile terminal 10 completes the subtraction process, the mobile terminal 10 reports this to the content transaction management server device 60.

In addition, the payment is not limited to using currency and may use points that may be converted into some privilege for the user.

Moreover, only a part of the data sets included in the content data may be encrypted. For example, if the content data is software providing a role-playing game, data showing an item, for example a weapon or the like used by characters in the game, is an example of the above part of data sets. In this case, in addition to the first URL and second URL described in the exemplary embodiment, multiple data-set identifiers attached to each item are described in the CPF. The first URL indicates the storage area in which the decryption keys for decrypting each of the data sets attached with the data-set identifiers.

The following is an explanation of the details centering on points of difference from the above exemplary embodiment.

In FIG. 6, when the content registration service is selected, the controller 11 of the mobile terminal 10 transmits, to the content transaction management server device 60, a request for a transmission of the marketed-content registration screen (S100). If the content transaction management server device 60 receives the request, the controller 61 transmits, to the mobile terminal 10, display data of the marketed-content registration screen (S110). If the mobile terminal 10 receives the display data, the controller 11 displays the marketed-content registration screen on the liquid crystal display 14 (S120). In addition to the first input column 91 for inputting the content name, the second input column 92 for inputting the price of the content, the third input column 93 for inputting the attached content, and the fourth input column 94 for inputting the content URL, which are shown in FIG. 8, the marketed-content registration screen is set with a fifth input column for inputting data-set identifiers allocated to the data sets (items used by characters in this example).

The user, referring to the marketed-content registration screen, after inputting the content name and price of the content they are registering into the first input column 91 and the second input column 92, performs operations for attaching the content data stored in the EEPROM 18 through operations of the instruction input part 13. Thereby, the file name of the content data to be attached is input into the third input column 93. Additionally, after inputting, into the fourth input column 94, the URL of the storage area of the content-providing server device 30 secured for storage of the content data and inputting, into the fifth input column, the data-set identifiers allocated to the data sets, the user selects the "Register" button. In addition, multiple data-set identifiers may be input. When the "Register" button is selected, the controller 11 of the mobile terminal 10 transmits, to the content transaction management server device 60, a content registration request including: data indicating the content name input into the first input column 91, the price input into the second input column 92, and the URL input into the fourth input column 94; the data-set identifiers input into the fifth input column; and the attached content data (S130). If the content transaction management server device 60 receives the content registration request, the controller 61 generates encrypted content data by applying unique encryption keys for only the data sets for which the data-set identifiers are allocated from among the content data included in the request (S140). Therefore, the encrypted content data includes encrypted data sets and non-encrypted data sets. At this time, if there are multiple data-set identifiers, encryption is conducted by applying different encryption keys for each data set for which a data-set identifier is allocated. Finally, the controller 61 stores, in the decryption-key database 63c, the decryption keys that is a counterpart of the encryption keys used in the encryption of Step 140 (S150). In addition, the controller 61 generates the CPF (S160). In addition to the content-name data indicating the content name, the price data indicating the price, and the first URL and the second URL, the CPF includes the above data-set identifiers. The controller 61 transmits, to the mobile terminal 10, the encrypted content data generated in Step 140 and the CPF generated in Step 160 (S170). If the mobile terminal 10 receives the encrypted content data and CPF, the controller 11 transmits, to the content-providing server device 30, a content registration request including the encrypted content data and CPF (S180). If the content-providing server device 30 receives the content registration request, the controller 31 identifies the encrypted content data and CPF from the request (S190). Next, in FIG. 7, the controller 31 stores the encrypted content data identified in Step 190 in the storage area of the hard disk 33 indicated by the second URL included in the CPF identified in Step 190 (i.e., the storage area indicated by the URL allocated in advance for storage of the content data) (S200).

Subsequently, the controller 31 stores the CPF identified in Step 190 in an unused storage area of the hard disk 33 (S210). The controller 31 transmits, to the mobile terminal 10, a registration completion message including the URL (this URL shall hereinafter be referred to as "third URL") of the storage area of the hard disk 33 in which the CPF is stored in Step 210 (S220). If the mobile terminal 10 receives the registration completion message, the controller 11 controls the EEPROM 18 to store the third URL included in the message (S230).

Figure 11:
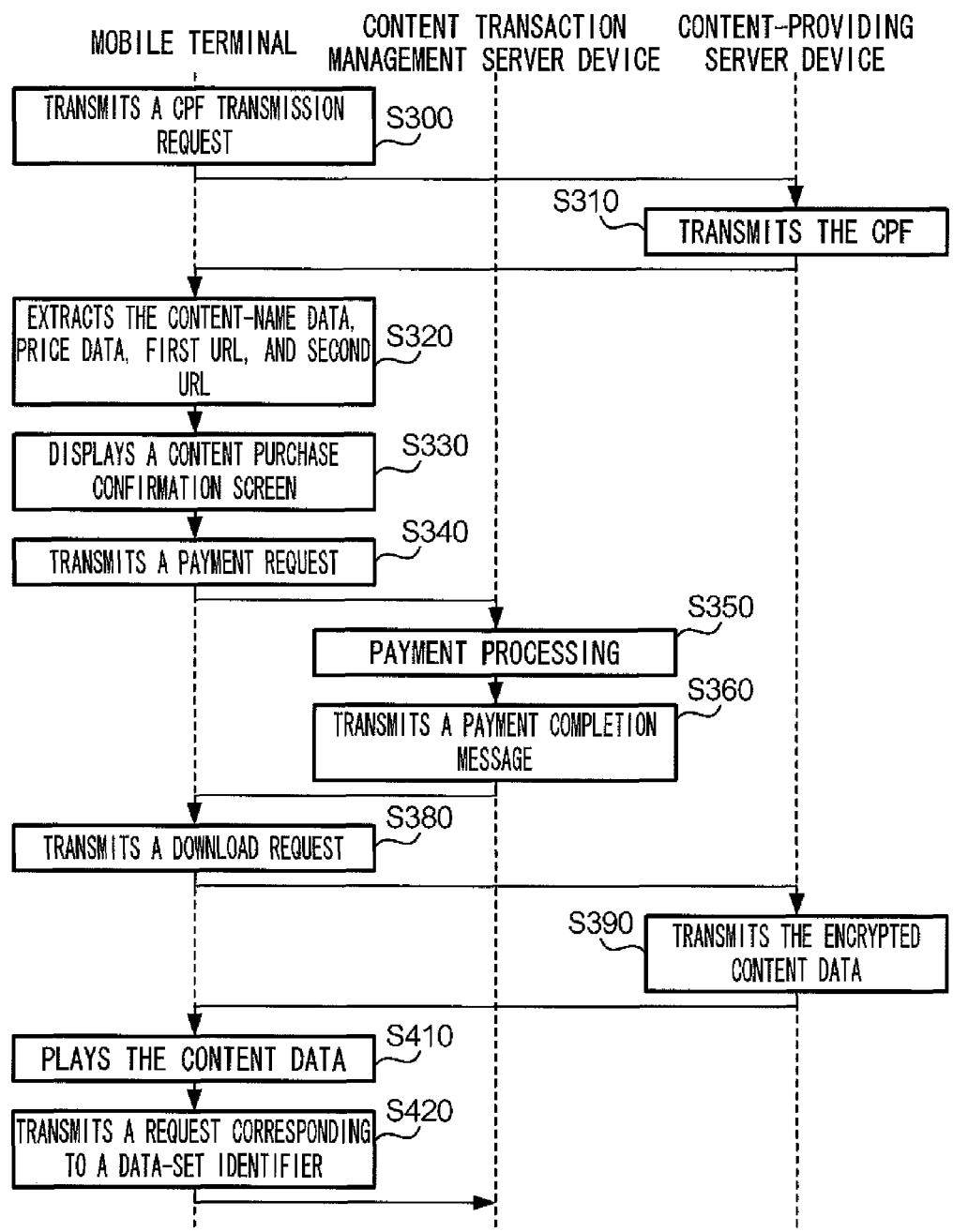
FIG. 11 shows a flowchart showing a separate example of a process for a content purchasing service.

Next, the content-purchase-service process is described with reference to FIG. 11. In FIG. 11, the same reference numerals are used for processes that are nearly identical to those in FIG. 10.

The user using the content purchase service selects the content purchase service from the service selection screen upon acquiring the third URL indicating the storage area of the CPF of the content data from a separate user who has registered encrypted content data onto the content-providing server device 30 using the content registration service, and storing the third URL in the EEPROM 18 of their personal mobile terminal 10. When the content purchase service is selected, the controller 11 of the mobile terminal 10 reads out the third URL from the EEPROM 18 and transmits, to the content-providing server device 30, a CPF transmission request including the third URL (S300). If the content-providing server device 30 receives the CPF transmission request, the controller 31 transmits, to the mobile terminal 10, the CPF stored on the hard disk 33 indicated by the third URL included in the request (S310).

If the mobile terminal 10 receives the CPF, the controller 11 extracts the content-name data, the price data, the first URL, and the second URL from the CPF (S320). The controller 11 displays, on the liquid crystal display 14, a content purchase confirmation screen obtained by embedding, in a predetermined form, the content-name data and price data extracted in Step 320 (S330). Then, when the "Purchase" button is selected, the controller of the mobile terminal 10 transmits, to the content transaction management server device 60, a payment request including the content-name data and price data extracted in Step 320 and a PIN code read out from the EEPROM 18 (S340). If the content transaction management server device 60 receives the payment request, the controller 61 performs payment processing of the cost of the content data (S350) and transmits, to the mobile terminal 10, a payment completion message (S360). If the mobile terminal 10 receives the payment completion message, the controller 11 transmits, to the content-providing server device 30, a download request including the second URL extracted in Step 320 (S380).

If the content-providing server device 30 receives the download request, the controller 31 transmits, to the mobile terminal 10, the encrypted content data stored in the storage area of the hard disk 33 indicated by the second URL included in the request (S390). If the mobile terminal 10 receives the encrypted content data, the controller 11 plays, opens, and executes the encrypted content data (S410). At this time, because only a part of the data sets of the encrypted content data are encrypted, the controller 11 may, with the exception of parts that are encrypted within the encrypted content data, play, open, and execute. The user, in the course of implementing the content data, which is a role-playing game in this example, will use items prepared in advance in accordance with progress in the game. In this case, when there is an instruction for an item that the user wishes to use, the controller 11 transmits, to the content transaction management server device 60, a request including the first URL and PIN code corresponding to the data-set identifier for the item (S420). The controller 61 of the content transaction management server device 60 performs payment processing of the cost of the item specified by the data-set identifier (S430). Specifically, the controller 61 identifies, from the packet-communication-charge management database, the call charge record of the user corresponding to the PIN code included in the payment request and adds, to the sum total of the call charge stored in the identified record, the predetermined price data corresponding to the item. Thereby, the purchase amount of the item is recorded in the calling rate claimed by the carrier from the user who is the purchaser. Then, when the money amount determined upon completion of this type of payment-procedure processing is reported to the payment system 70 and payment processing is requested, the payment system 70 withdraws the money amount from the bank account of the user who is the purchaser. At the same time, regarding the user who is the seller, the controller 61 performs processing to provide the money amount equivalent to the price data included in the payment request.

If the controller 61 has completed the payment processing, the controller 11 reads out the decryption key stored in the storage area of the decryption-key database 63*c* indicated by the first URL included in the above request and transmits, to the mobile terminal 10, a payment completion message including the decryption key (S440). If the mobile terminal 10 receives the payment completion message, the controller 11 controls the EEPROM 18 to store the decryption key included in the message (S450). Subsequently, the controller 11 restores the item by applying the decryption key to the above data set (S460), the decryption key being read out from the EEPROM 18. The restored item is used by the character in the role-playing game.

In addition, in the above example, the first URL and the data-set identifiers are described in the CPF, and the second URL may not be described. In this case, the encrypted content data is not provided to the mobile terminal 10 through the content-providing server device 30 and may be provided to the mobile terminal 10 through a separate arbitrary method. Finally, after the encrypted content data is stored by the mobile terminal, the processes from S410 onward in FIG. 11 that are described above are performed.

The hardware configurations of the mobile terminal, content transaction management server device, and content-providing server device are not limited to each of those shown in FIG. 2, FIG. 4, and FIG. 5. If the required configuration may be implemented, these devices may have any type of hardware configuration. For example, in the exemplary embodiment described above, the controller 61 of the content transaction management server device 60 includes multiple functions, specifically, the functions of the payment-request reception means, the payment-procedure processing means, the decryption-key transmission means, the content-data reception means, the encryption means, the storage control means, and the file transmission means. However, at least one of these functions may be implemented using a hardware component separate from the controller 61.

The programs that are executed by controller 11, controller 31, or controller 61 in the exemplary embodiment described above may be provided in a state of storage on a computer-readable storage medium, such as a magnetic recording medium (magnetic tape, magnetic disk (HDD (Hard Disk Drive), FD (Floppy Disk)), or the like), an optical recording medium (optical disk (CD (Compact Disc), DVD (Digital Versatile Disc)), or the like), a magneto-optical medium, a semiconductor memory (flash ROM or the like), or the like. Moreover, the programs may also be downloaded through a network such as the Internet.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular device or program to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A content transaction management server device comprising:
   storage configured to store a decryption key used for decryption of encrypted content data;
   a communication unit configured to communicate information; and
   a controller in communication with said storage, wherein said storage includes instructions on a non-transitory computer readable medium, the instructions, when executed, perform:
   receiving a payment request through the communication unit, the payment request including a first storage address and a user identifier, the first storage address indicating a storage area in the storage in which the decryption key is stored, the user identifier identifying a user, who is a purchaser of the encrypted content data;
   performing payment-procedure processes related to a transaction for purchase of the encrypted content data by the user identified by the user identifier included in the payment request;
   transmitting the decryption key through the communication unit to a transmission source of the payment request, after the payment-procedure processing is completed, the transmitted decryption key being read out from the storage area in the storage, the storage area being indicated by the first storage address included in the payment request;
   receiving, through the communication unit, content data and a second storage address indicating a storage area of an external device;
   generating encrypted content data by applying a predetermined encryption key to the received content data;
   controlling the storage to store a decryption key that is a counterpart of the encryption key used in the encryption; and
   transmitting a definitions file and the encrypted content data, through the communication unit to a transmission source of the content data and the second storage address, the definitions file including the first storage address indicating the storage area where the decryption keys are stored and the second storage address.

2. The content transaction management server device according to claim 1, wherein the content data includes a plurality of data sets and the encrypted content data includes an encrypted data set and unencrypted content data; and
   the instructions, when executed, further perform:
   receiving, through the communication unit, a data-set identifier for identifying one of the data sets included in the content data;
   generating the encrypted content data by applying the predetermined encryption key to a data set specified from among the received content data by the data-set identifier; and
   transmitting the definitions file and the encrypted content data through the communication unit to a transmission source of the content data and the data-set identifiers, the definitions file further including the second storage address and the data-set identifier.

3. The content transaction management server device according to claim 1, wherein the content data includes a plurality of data sets and a data-set identifier for specifying a data set included in the content data and the encrypted content data includes an encrypted data set and unencrypted content data; and
   the instructions, when executed, further perform:
   generating the encrypted content data, the encrypted data set being encrypted by applying the predetermined encryption key to a data set specified from among the received content data by the data-set identifier; and
   transmitting, through the communication unit to a transmission source of the content data and the data-set identifier, a definitions file for data-set acquisition procedures and encrypted content data, the definitions file including the first storage address and the data-set identifier.

4. A content-providing server device comprising:

storage configured to store information;

a communication unit configured to communicate information; and a controller in communication with said storage, wherein said storage includes instructions on a non-transitory computer readable medium, the instructions, when executed, perform:

receiving encrypted content data and a definitions file for acquisition procedures, the definitions file including a first storage address and a second storage address, the first storage address indicating a storage area in which a decryption key is stored, the decryption key being a counterpart of an encryption key used for generating the encrypted content data, the second storage address indicating a storage area in the storage;

controlling the storage area to store the encrypted content data in the storage area indicated by the second storage address, and to store the definitions file in another storage area different from the storage area;

transmitting the definitions file, the definitions file being read out from the storage;

receiving, through the communication unit, a download request including the second storage address from a transmission source of the definitions file; and transmitting, through the communication unit to a transmission source of the download request, the encrypted content data read out from the storage area in the storage indicated by the second storage address included in the received download request.

* * * * *